United States Patent
Bayer

(10) Patent No.: US 12,330,364 B2
(45) Date of Patent: Jun. 17, 2025

(54) DEVICE AND PROCESS TO PERMIT MONOAXIAL CHANGES IN THE LENGTH OF FILM WEBS

(71) Applicant: HOSOKAWA ALPINE Aktiengesellschaft, Augsburg (DE)

(72) Inventor: Bernd Bayer, Bobingen (DE)

(73) Assignee: HOSOKAWA ALPINE Aktiengesellschaft, Augsburg (DE)

( * ) Notice: Subject to any disclaimer, the term of this patent is extended or adjusted under 35 U.S.C. 154(b) by 341 days.

(21) Appl. No.: 17/151,814

(22) Filed: Jan. 19, 2021

(65) Prior Publication Data

US 2021/0221043 A1     Jul. 22, 2021

(30) Foreign Application Priority Data

Jan. 21, 2020  (DE) ................. 10 2020 000 334.6

(51) Int. Cl.
   *B29C 55/06*   (2006.01)
   *B29C 55/28*   (2006.01)

(52) U.S. Cl.
   CPC .............. *B29C 55/06* (2013.01); *B29C 55/28* (2013.01)

(58) Field of Classification Search
   None
   See application file for complete search history.

(56) References Cited

U.S. PATENT DOCUMENTS

| | | | |
|---|---|---|---|
| 2,206,981 A | 7/1940 | Sturtevant | |
| 2,285,375 A * | 6/1942 | Hansen | D06B 23/02 29/895.32 |
| 2,780,443 A | 2/1957 | Holloway | |
| 3,770,124 A | 11/1973 | Frangquist | |
| 3,809,515 A | 5/1974 | Farrell | |
| 3,962,023 A | 6/1976 | Hofer | |
| 4,003,973 A * | 1/1977 | Kurokawa | B29C 48/912 264/237 |
| 4,018,388 A | 4/1977 | Andrews | |
| 4,080,143 A | 3/1978 | Upmeier | |

(Continued)

FOREIGN PATENT DOCUMENTS

| | | |
|---|---|---|
| AT | 304 058 B | 12/1972 |
| BR | 102019026088 A2 | 7/2020 |

(Continued)

OTHER PUBLICATIONS

For U.S. Appl. No. 16/600,260: Final Office Action dated Apr. 13, 2022.

(Continued)

*Primary Examiner* — Abbas Rashid
*Assistant Examiner* — Caroline Beha
(74) *Attorney, Agent, or Firm* — Paul D. Bianco; Fleit Intellectual Property Law; Stephen Bongini

(57) ABSTRACT

In the case of a device to permit the monoaxial length change of film webs in machine direction, which comprises at least one processing gap delimited by two rolls via which a film web is routed in machine direction, whereby the first roll in film transport direction exhibits a first peripheral speed and the second roll in film transport direction exhibits a second peripheral speed, in order to produce film webs with low transverse neck-in as well as reduced edge build-up and to improve the flatness of the film web.

18 Claims, 2 Drawing Sheets

(56) References Cited

U.S. PATENT DOCUMENTS

| | | |
|---|---|---|
| 4,133,488 A | 1/1979 | Heinemann |
| 4,165,356 A | 8/1979 | Heider |
| 4,510,300 A * | 4/1985 | Levy .................. C08J 5/18 |
| | | 264/235 |
| 4,602,743 A | 7/1986 | Nied |
| 4,858,422 A * | 8/1989 | Stahlecker .............. D01H 4/16 |
| | | 57/411 |
| RE33,085 E | 10/1989 | Petersen |
| 4,994,214 A * | 2/1991 | Stevens ................. B29C 71/02 |
| | | 264/237 |
| 5,043,036 A | 8/1991 | Swenson |
| 5,076,776 A | 12/1991 | Yamada et al. |
| 5,120,431 A | 6/1992 | Cordonnier |
| 5,135,614 A | 8/1992 | Aula |
| 5,358,163 A | 10/1994 | Naka |
| 5,370,327 A | 12/1994 | Adamski |
| 5,377,843 A | 1/1995 | Schumacher |
| 5,377,931 A | 1/1995 | Dorfel |
| 5,505,601 A | 4/1996 | Sensen et al. |
| 5,506,046 A * | 4/1996 | Andersen ............... C04B 24/00 |
| | | 524/498 |
| 5,544,841 A | 8/1996 | Didier et al. |
| 5,558,930 A | 9/1996 | DiPoto |
| 5,673,870 A | 10/1997 | Fielding et al. |
| 5,716,650 A | 2/1998 | Marridis |
| 5,735,481 A | 4/1998 | Loosen |
| 5,769,362 A | 6/1998 | Biagiotti |
| 5,967,449 A | 10/1999 | Thomas et al. |
| 5,992,773 A | 11/1999 | Schwechten |
| 6,054,178 A * | 4/2000 | Howells ................. B32B 37/153 |
| | | 427/398.1 |
| 6,169,122 B1 | 1/2001 | Blizard |
| 6,189,821 B1 | 2/2001 | James |
| 6,260,786 B1 | 7/2001 | Ueyama |
| 6,398,139 B1 | 6/2002 | Nied |
| 6,413,595 B1 | 7/2002 | Schirmer |
| 6,543,710 B2 | 4/2003 | Hosokawa |
| 6,783,344 B1 | 8/2004 | Rudolf |
| 6,964,394 B1 | 11/2005 | Räty et al. |
| 7,028,931 B2 | 4/2006 | Lin |
| 7,036,763 B2 | 5/2006 | Böhm et al. |
| 7,255,301 B2 | 8/2007 | Schmidt-Hebbel et al. |
| 7,481,390 B2 | 1/2009 | Reinhold |
| 7,596,839 B2 | 10/2009 | Busch |
| 7,811,073 B2 | 10/2010 | Mahler et al. |
| 7,850,102 B2 | 12/2010 | Meier et al. |
| 7,913,851 B2 | 3/2011 | Chang |
| 8,033,399 B2 | 10/2011 | Pistorius |
| 8,039,105 B2 | 10/2011 | Meier et al. |
| 8,231,007 B2 | 7/2012 | Wark |
| 8,309,206 B2 | 11/2012 | Rasmussen |
| 8,322,646 B2 | 12/2012 | Ueyama et al. |
| 8,353,408 B2 | 1/2013 | Ito |
| 8,714,359 B2 | 5/2014 | Aizawa |
| 8,784,716 B2 | 7/2014 | Rasmussen |
| 9,022,222 B2 | 5/2015 | Devroe |
| 9,302,423 B2 | 4/2016 | Bayer |
| 9,333,699 B2 | 5/2016 | Linkies |
| 10,052,799 B2 | 8/2018 | Alpine |
| 10,137,629 B2 | 11/2018 | Gandelheidt |
| 10,252,298 B2 | 4/2019 | Alpine |
| 10,906,232 B2 | 2/2021 | Gandelheidt |
| 11,339,021 B2 | 5/2022 | Durner |
| 11,358,324 B2 | 6/2022 | Backmann |
| 11,654,605 B2 | 5/2023 | Baier |
| 2002/0086071 A1 | 7/2002 | Rubhausen |
| 2005/0202205 A1 | 9/2005 | Peterson |
| 2007/0149376 A1 * | 6/2007 | Holtmann ............... B65H 20/12 |
| | | 165/89 |
| 2009/0104465 A1 | 4/2009 | Yanagida |
| 2010/0173031 A1 | 7/2010 | Roberts et al. |
| 2010/0216963 A1 | 8/2010 | Ueda |
| 2010/0320308 A1 | 12/2010 | Ueyama et al. |
| 2011/0006452 A1 | 1/2011 | Bayer |
| 2011/0229722 A1 | 9/2011 | Rivett |
| 2014/0177235 A1 | 6/2014 | Lin |
| 2014/0367882 A1 * | 12/2014 | Backmann ............... B29C 55/12 |
| | | 264/165 |
| 2015/0147420 A1 * | 5/2015 | Kang .................... B29C 48/917 |
| | | 425/71 |
| 2016/0052192 A1 | 2/2016 | Backmann |
| 2016/0257056 A1 | 9/2016 | Schumacher et al. |
| 2016/0263813 A1 * | 9/2016 | Lettowsky ............... B29C 55/28 |
| 2017/0036386 A1 | 2/2017 | Planeta et al. |
| 2020/0114564 A1 | 4/2020 | Baier |
| 2020/0180890 A1 | 6/2020 | Durner et al. |
| 2021/0221043 A1 | 7/2021 | Bayer |
| 2022/0105520 A1 | 4/2022 | Fuchs |
| 2023/0241830 A1 | 8/2023 | Bayer |
| 2024/0048840 A1 | 2/2024 | Zhang |
| 2024/0083083 A1 | 3/2024 | Golubski |

FOREIGN PATENT DOCUMENTS

| | | |
|---|---|---|
| CA | 2191630 A1 | 6/1997 |
| CA | 3064404 A1 | 6/2020 |
| CH | 537800 | 6/1973 |
| CN | 85105182 A | 12/1986 |
| CN | 1500712 A | 6/2004 |
| CN | 101005936 A | 7/2007 |
| CN | 201280352 Y | 7/2009 |
| CN | 101987703 A | 3/2011 |
| CN | 102083722 A | 6/2011 |
| CN | 104070667 A | 3/2013 |
| CN | 104023943 A | 9/2014 |
| CN | 204 183 848 U | 3/2015 |
| CN | 205634333 U | 10/2016 |
| CN | 106467252 A | 3/2017 |
| CN | 107825682 A | 3/2018 |
| CN | 110049856 A | 7/2019 |
| CN | 111302117 A | 6/2020 |
| DE | 291871 C | 5/1916 |
| DE | 22 50 151 A1 | 5/1974 |
| DE | 2555848 | 6/1977 |
| DE | 2919249 A1 | 11/1979 |
| DE | 3140294 A1 | 4/1983 |
| DE | 3338138 A1 | 5/1985 |
| DE | 34 25 101 A1 | 1/1986 |
| DE | 4100338 A1 | 7/1992 |
| DE | 4140656 C1 | 9/1992 |
| DE | 4116964 A1 | 11/1992 |
| DE | 9214651 U1 | 2/1993 |
| DE | 4428249 A1 | 2/1995 |
| DE | 4405462 C1 | 4/1995 |
| DE | 295 05 311 U1 | 6/1995 |
| DE | 295 05 311 | 7/1995 |
| DE | 19613902 A1 | 10/1997 |
| DE | 197 28 382 A1 | 1/1999 |
| DE | 19755357 A1 | 6/1999 |
| DE | 198 40 344 A1 | 5/2000 |
| DE | 10035894 A1 | 4/2001 |
| DE | 10029175 | 6/2001 |
| DE | 10059306 C1 | 5/2002 |
| DE | 20117248 U1 | 3/2003 |
| DE | 697 15 377 T2 | 6/2003 |
| DE | 10 2004 040 151 A1 | 3/2006 |
| DE | 10 2006 048 850 A1 | 4/2008 |
| DE | 20 2008 012 076 U1 | 11/2008 |
| DE | 102009033171 A1 | 1/2011 |
| DE | 10 2009 046 593 A1 | 5/2011 |
| DE | 102009046585 A1 | 5/2011 |
| DE | 10 2011 085735 A1 | 5/2013 |
| DE | 10 2013 007 669 | 11/2014 |
| DE | 10 2013 007 669 A1 | 11/2014 |
| DE | 10 2013 016898 A1 | 4/2015 |
| DE | 10 2016 012 389 A1 | 4/2018 |
| DE | 11 2015 001 615 B4 | 4/2018 |
| DE | 102016012388 A1 | 4/2018 |
| DE | 102016012424 A1 | 4/2018 |
| DE | 202013012786 U1 | 9/2019 |
| DE | 102018009632 A1 | 6/2020 |
| DE | 102019107335 A1 | 7/2020 |
| DE | 10 2019 215 492 A1 | 4/2021 |

(56) References Cited

FOREIGN PATENT DOCUMENTS

| | | | | |
|---|---|---|---|---|
| EP | 0139279 | A2 | 5/1985 | |
| EP | 0449548 | A2 | 10/1991 | |
| EP | 0 471 879 | A1 | 2/1992 | |
| EP | 1947043 | A1 | 7/2008 | |
| EP | 2261152 | A1 | 12/2010 | |
| EP | 2277681 | A1 | 1/2011 | |
| EP | 2639038 | A1 | 9/2013 | |
| EP | 2873508 | A1 | 5/2015 | |
| EP | 3266586 | A1 | 1/2018 | |
| EP | 2326481 | B1 | 5/2018 | |
| EP | 3666700 | A1 | 6/2020 | |
| GB | 1331667 | A | 9/1973 | |
| GB | 2073848 | A * | 10/1981 | ............ B65H 20/12 |
| GB | 2 253 807 | A | 9/1992 | |
| JP | S58-65628 | A | 4/1983 | |
| JP | S59-169818 | A | 9/1984 | |
| JP | S60 141229 | U | 9/1985 | |
| JP | 10315363 | A | 12/1988 | |
| JP | 161257 | | 6/1992 | |
| JP | 15193 | | 2/1994 | |
| JP | H06-064039 | A | 3/1994 | |
| JP | H 09-507799 | A | 8/1997 | |
| JP | 2822758 | B2 | 11/1998 | |
| JP | 2001080801 | A | 3/2001 | |
| JP | 2003-072997 | A | 3/2003 | |
| JP | 2005161619 | A * | 6/2005 | |
| JP | 4203271 | B2 | 12/2008 | |
| JP | 2009249178 | A | 10/2009 | |
| JP | 2011-51782 | A | 10/2012 | |
| JP | 2013-129169 | A | 7/2013 | |
| JP | 2013245105 | A | 12/2013 | |
| JP | 2016044295 | A | 4/2016 | |
| JP | 2016-117588 | A | 6/2016 | |
| JP | 2017-036146 | | 2/2017 | |
| JP | 2018-069639 | A | 5/2018 | |
| JP | 6916085 | B2 | 8/2021 | |
| JP | 7216124 | B2 | 1/2023 | |
| RU | 2060219 | C1 | 5/1996 | |
| RU | 2 124 465 | C1 | 1/1999 | |
| RU | 2128617 | C1 | 4/1999 | |
| RU | 2457945 | C2 | 8/2012 | |
| RU | 2568482 | C2 | 11/2015 | |
| RU | 2737006 | C1 | 11/2020 | |
| RU | 2776380 | C1 | 7/2022 | |
| SU | 1615113 | A1 | 12/1990 | |
| TW | M504084 | U | 7/2015 | |
| WO | 94/12290 | A1 | 6/1994 | |
| WO | 2005/70653 | A1 | 8/2005 | |
| WO | 2006/018293 | A1 | 2/2006 | |
| WO | 2013/064422 | A1 | 5/2013 | |
| WO | 2014/023282 | A1 | 2/2014 | |
| WO | 2015/055170 | A1 | 4/2015 | |
| WO | 2018/079213 | A1 | 5/2018 | |

OTHER PUBLICATIONS

Chinese Search Report dated Oct. 12, 2019 for Application No. 201910965569.4 with English translation.
European Search Report dated Feb. 18, 2020 for EP 19 00 0457.
German Search Results for Application No. 10 2018 008 127.4 filed Oct. 13, 2018.
Response to Office Action filed Jan. 4, 2022 for U.S. Appl. No. 16/600,260.
Search Report dated Jun. 29, 2020, from Russian Patent Office for RU Appl. No. 2019140284 (with Eng translation).
Search Report from Taiwan Patent Office dated Oct. 24, 2020, for Application No. 108144774 (1 page).
Search Report from Chinese Patent Office for Application No. 201911262431.4, filed Dec. 11, 2019.
Search Report from Chinese Patent Office dated Dec. 17, 2020, for Application No. CN201911262431.4 (11 pages).
Notice of Allowance dated Feb. 18, 2022 for U.S. Appl. No. 16/709,025.
European Search Opinion for European Application No. 17 00 1985, filed Dec. 16, 2017, 15 pages (with machine language translation).
German Search Report for Application No. 10 2016 015 051.3, filed Dec. 16, 2016, 1 page.
European Search Report dated Apr. 26, 2018, for EP 17 00 1985, filed Dec. 16, 2017, 3 pages.
German Office Action dated Oct. 25, 2017 for Application No. 10 2016 015 051.3, 3 pages (with machine translation).
Notice of Allowance dated Mar. 31, 2022 for U.S. Appl. No. 16/709,025.
Result of Examination Report for DE 10 2014 017 556.1 dated Nov. 28, 2014.
European Search Report and Search Opinion for EP15 00 3362 dated May 9, 2016.
Office Action for DE 10 2014 017 556.1 dated Jul. 7, 2015.
For U.S. Appl. No. 16/600,260: Office Action dated Oct. 4, 2021.
Search Report for German Application No. 10 2016 015 051.3, filed Dec. 16, 2016.
Search Report for German Application No. 10 2018 008 127.4 dated Oct. 13, 2018.
Ex parte Quayle Office Action dated Dec. 1, 2021 for U.S. Appl. No. 16/709,025.
Response to Final Office Action with RCE, filed Jul. 13, 2022, for U.S. Appl. No. 16/600,260.
Office Action dated Oct. 11, 2022 for U.S. Appl. No. 16/600,260.
Response to Office Action filed Jan. 9, 2023 for U.S. Appl. No. 16/600,260.
For Canadian Patent Application No. 3, 106,631: Office Action dated Apr. 8, 2022 (4 pages) Office Action dated Nov. 25, 2022 (5 pages).
For Chinese Patent Application No. 202110079982.8 filed Jan. 21, 2021 First Office Action (9 pages) Search Report (2 pages).
Search Report for German Patent Application No. 10 2020 000 334.6 dated Dec. 15, 2021 (5 pages).
For European Patent Application No. 21 00 0011: European Search Report dated Sep. 23, 2021 (5 pages) Extended European Search Rpoert dated Oct. 1, 2021 (15 pages).
For Japanese Patent Application No. 2021-007111: Decision of Refusal dated May 12, 2022 (6 pages) Notice of Reasons for Refusal Feb. 1, 2022 (8 pages) Search Report dated Jan. 25, 2022 (13 pages).
For Russian Patent Application No. 2021101095/04 filed Jan. 20, 2021: Office Action dated Dec. 20, 2021 (6 pages) Office Action and Search Report dated Jul. 30, 2021 (9 pages).
Office Action, dated Aug. 28, 2023, for Canadian Patent Application No. 3,106,631.
For Chinese Patent Application No. 202110079982.8 Second Office Action, dated Mar. 25, 2023 Third Office Action, dated Aug. 21, 2023 Rejection Decision, Nov. 27, 2023.
For European Patent Application No. 21 000 011.3: European Communication dated Mar. 11, 2024 European Communication dated Oct. 24, 2023.
For Indonesian Patent App. No. P00202100426 Substantive Exam Results, dated Oct. 10, 2023 Indonesian Patent No. IDP000091201 issued Dec. 18, 2023.
For Indian Patent Application No. 202134001796 Examination Report dated Oct. 1, 2021 Grant and Recordal, Jan. 16, 2024.
Office Action dated Aug. 26, 2024 for U.S. Appl. No. 18/100,025.
Office Action dated Aug. 20, 2024 for Mexican Patent Application No. MX/a/2021/000885 filed Jan. 21, 2021.
Office Action dated Sep. 8, 2023 for European Patent Application 23000013.5.
Office Action dated Aug. 17, 2022 for German Patent Application No. 10 2022 000 351.1.
For Chinese Patent Application No. 202110079982.8: Reexamination decision dated May 23, 2024.
For EP Patent Application No. 21 000 011.3: Office Action dated Jun. 25, 2024.
For Mexican Patent Appl. No. MX/a/2021/000885: Office Action dated May 16, 2024.

* cited by examiner

DEVICE AND PROCESS TO PERMIT MONOAXIAL CHANGES IN THE LENGTH OF FILM WEBS

FIELD OF THE DISCLOSURE

The disclosure relates to a device and a process to permit monoaxial changes in the length of film webs in machine direction. This comprises at least one processing gap delimited by two rolls via which a film web is routed in machine direction, whereby the first roll in film transport direction exhibits a first peripheral speed and the second roll in film transport direction exhibits a second peripheral speed.

BACKGROUND

In the production of film, orientation lines are used to reduce the thickness of film after its production. The orientation of film is used for both tubular film and for cast film.

An orientation line generally consists of heated rolls in order to prepare the film for orientation followed by orientation rolls between which the film is oriented. Orientation can be followed by so-called annealing or tempering rolls where the film is subjected to heat treatment in order to influence the film properties. As the final step, the film is cooled by means of cooling rolls. By orienting the film webs, it is not only the geometric dimensions of the film that can be altered, but also the properties of the film such as transparency or strength can be influenced in a targeted manner.

Orientation units are operated either offline or in-line within blown film lines. The orientation of tubular film can be performed in-line within blown film lines directly after the pair of take-off rolls or downstream of the turning bar unit which is installed downstream of the two take-off rolls.

In the case of the monoaxial orientation of film webs in machine direction, also known as longitudinal orientation, a transverse necking, the so-called neck-in, occurs with simultaneous thickening of the edges, the so-called edge build-up. This effect is extremely unfavourable for the downstream processing of the film. The neck-in is disadvantageous in that it exacerbates the film production process with respect to the flatness of the film demanded for the downstream film processing. The greater the neck-in is, the more difficult it is to achieve the demanded film quality of monoaxially oriented film in an efficient and economic manner. Disadvantages such as hanging film edges and other flatness faults then occur when unwinding the finished reels. This leads to a poor reel quality and thus to a poorer suitability of the film for downstream processing, for example for printing or laminating.

Patent DE 10 2009 046 585 A1 reveals an orientation line designed for the longitudinal orientation of film webs as well as a dedicated process. The orientation system comprises mainly a heating unit, an orientation unit and a cooling unit. In order to lessen the neck-in and the edge build-up when longitudinally orienting the film web, a pressure mechanism in the form of a lay-on roll is used which presses the film web against the orientation roll.

Patent DE 10 2009 046 593 A1 also reveals an orientation line designed for the longitudinal orientation of film webs as well as a dedicated process. In order to lessen the neck-in and the edge build-up, a deflection roll is installed in the orientation gap between the two orientation rolls of the orientation unit. This serves to reduce the necking of the film.

The transverse shrinkage or necking of the monoaxially oriented film can be counteracted during orientation also by the temperature setting of the orientation rolls, as is disclosed in patent DE 10 2011 085 735 A1. In addition, the orientation gap adjustment unit can also be used to counteract the necking. Decreasing the roll gap leads to a reduction of the film neck-in.

In order to improve the flatness of the films produced with blown film lines which are then oriented downstream in orientation systems, film thickness regulation methods such as are known from DE 10 2009 033 171 A1 are employed. The edge build-up during monoaxial orientation in machine direction is thereby reduced. To this end, those areas which later form the edge zones of the laid-flat film are provided with thin spots during manufacture of the film tubes so that after orientation, an end product with as uniform a thickness as possible across the film web width is achieved. This process also has a positive effect on the reduction of the transverse shrinkage.

SUMMARY

One aspect of the disclosure relates to a solution which makes it possible in units designed for the monoaxial length change of film webs in machine direction to manufacture film webs of improved flatness in that the transverse neck-in and thus the edge build-up are reduced. This increases the quality of the finished film reel.

In one disclosed embodiment, a device design is for the monoaxial length change of film webs in machine direction of the generic kind.

In one embodiment, the device disclosed herein where in comparison with the state of the art, at least one of the rolls which delimit the processing gap in which the film web experiences a length alteration is replaced by a roll through which air can be routed. The design of this roll is such that the flow pattern of the air is from the outside in.

As the film web is transported over the rolls, a boundary layer of air is drawn in onto the film web between the film web and the roll. These air cushions have a negative effect on the flatness of the film web during orientation of the film in the processing gap.

By using the air-flow rolls through which the air flow pattern is from the outside in, the air which is drawn in can continuously pass through the air-flow roll to the inside into the roll and the film lays across its entire width direct on the rolls. The flatness of the film web is improved. These air cushions develop especially at high machine speeds.

A transverse neck-in caused by orientation of the film web with simultaneous edge build-up is also counteracted and reduced by the film laying direct on the roll.

If this effect is insufficient, the air-flow roll where the air can be routed from the outside in can be fitted with a negative pressure connection; the negative pressure causes the film web to be sucked onto the roll and it adheres more strongly to the roll and reduces the neck-in and the edge build-up.

The measure for the neck-in and edge build-up is connected among other things with the adhesion of the film on the rolls which delimit the processing gap. The film slips increasingly to the outer zone in transverse direction, i.e. perpendicular to the transport direction of the film web across the roll surface, and attempts in this way to compensate the transverse forces acting upon it. This transverse neck-in takes place essentially in the processing gap and on the rolls themselves.

The aim is to set the negative pressure at the rolls such that the adhesion of the film web on the roll is improved as a result of the increased friction, and the relative speed in transverse and longitudinal direction between the film and the roll is prevented. A uniform contact of the film on the roll across the lay-flat width is achieved. This results in a defined release edge of the film web on the roll in film transport direction at the point where the film runs off the roll just as in a defined lay-on edge of the film web on the roll in film transport direction at the point where the film runs onto the roll.

The magnitude of the negative pressure is also dependent on the desired length change of the film web, the machine speed and the film properties.

The force with which the film is sucked onto the roll is a function of the level of negative pressure. This is usually between about 100 and 300 mbar, in special cases it can also be selected to be higher or lower. The negative pressure is regulated as a function of the characteristics of the film and the desired length change. In accordance with the disclosure, at least one of the rolls which delimits the processing gap of the length change device is designed as an air-flow roll through which the air flows from the outside in.

In a preferred design, the second roll downstream of the processing gap is designed as an air-flow roll.

The air that is drawn in flows through the roll and the film has direct contact on the roll across its entire width.

If the effect is insufficient, in another disclosed design, the air-flow roll is connected to a negative pressure source.

The negative pressure which is applied to the air-flow roll causes the film web to be sucked onto the roll. As a result, the friction of the film web on the roll of the device is increased, thus reducing the transverse shrinkage downstream of the processing gap. The film is sucked thereby uniformly across its entire width including the film edges onto the roll.

In another disclosed design, the first roll in the unit upstream of the processing gap is designed as an air-flow roll. The contact between the film web and the roll is increased and prevents the formation of air cushions in between the two. The film web thus lays uniformly on the roll. The film web reaches the processing gap with a reduced level of transverse neck-in. The flatness is positively influenced. This roll can also be connected up to a negative pressure source in another disclosed design. The higher forces serve to increase the effects.

In another disclosed design, the roll upstream and the roll downstream of the processing gap is designed as an air-flow roll in each case. This serves to improve the adhesion of the film web between the film web and the rolls with no air entrapped in between, and the neck-in and edge build-up on the film is reduced. In a preferred disclosed design, the second roll is additionally connected up to a negative pressure source. This counteracts the transverse neck-in. In rare cases, both rolls can be connected up to a negative pressure source.

In the disclosed-design equipment, the air-flow rolls can interact with and without lay-on rolls. The lay-on rolls serve to additionally fix the film web on the air-flow rolls. They increase the contact of the film to the roll so that the film lays uniformly on the roll.

Dependent on the orientation task, it can be necessary to suck the film across its width onto the air-flow roll to varying degrees, for example more suction at the edges than towards the centre of the film web. In that case, the air-flow roll is designed such that different degrees of negative pressure can be applied over its axial length.

Dependent on the problem specification, a combination of air-flow roll and tempering roll can also be employed. On the one hand, this tempers the film web so that it has the right temperature for the length change and on the other hand, the air drawn in between the film web and the roll can flow to the inside via the air-flow roll. Thanks to the direct contact of the film web on the roll, the heat transfer from roll to film web is also better. If in addition, negative pressure is applied to the rolls in order to suck the film web onto the roll more strongly, the friction between film and roll increases and the neck-in reduces even further.

The tempering can involve heating or cooling. On one side of the combined rolls, the fluid such as gas, steam, water or oil for tempering the roll is supplied and removed via a rotary union. On the opposite side to where the fluid is supplied and removed, a negative pressure source is connected via a rotary union and the air is drawn in. If no negative pressure is applied, the air escapes through these openings. If the roll is a pure air-flow roll, the fluid supply and removal for tempering is omitted.

The combined tempering and air-flow roll consists, just as the state-of-the-art rolls, also of a fluid-tempered double-jacket roll, it is equipped with additional channels for air routing and can be connected up to a negative pressure source. The channels can also be in the form of small drilled holes.

Ideally, an air-permeable layer is applied, similar to a sintered structure. It is also possible to manufacture the rolls from an open-pore material with pores in the micrometre range. The rolls are made of materials such as steel, stainless steel or plastic. In a preferred disclosed design, the sintered layer, for example, is made of non-corrosive stainless steel which can also be polished to a glossy finish. In addition, the friction and/or adhesion between the film web and the roll can be influenced as a function of the surface roughness or the surface structure of the rolls.

If tempering is not necessary, rolls of the same type and without double jacket are employed.

The reduction of the transverse neck-in of the film web results in new physical film properties which in turn lead to superior downstream processes in printing devices and lamination units thanks to the improved flatness. This leads furthermore to less edge trimming waste.

The device for length change includes processing gaps which are delimited in each case by two rolls. The first roll in film web transport direction exhibits a first peripheral speed and the second roll in film web transport direction exhibits a second peripheral speed so that the film web in between experiences a length change in the processing gap.

In the event that the second roll exhibits a higher peripheral speed than the first roll, this results in a positive length change of the film. Dependent on the length change ratio, one speaks of orientation, stretching or annealing. There is no clear dividing line in the length change of film between annealing, stretching and orientation. Length change ratios of between approx. 1:1 and 1:10 can be achieved.

In the case of annealing, not only elongation but also shrinkage of the film web can be permissible, because the second roll rotates at a lower peripheral speed than the first roll and this results in a negative length change.

The shrinkage ratio is usually between approx. 0.5:1 and 1:1.

It can also be that both rolls which delimit the processing gap exhibit the same peripheral speed.

In one design, the disclosed-design unit for changing the length of a film web is an integral component of an orientation unit.

In orientation units, which usually comprise an arrangement of heated rolls, orientation rolls, annealing rolls and cooling rolls, the orientation roll downstream of the orientation gap or processing gap is replaced by an air-flow roll because this is where the greatest improvement for the orientation process results.

Such orientation units can either be operated in-line or offline within a film production line.

It is also possible within an orientation system to install several disclosed-design units which have at least one processing gap delimited by two rolls.

It is, however, also possible in orientation lines with the disclosed-design unit to have more orientation rolls or more rolls such as the annealing rolls downstream of the orientation rolls and cooling rolls as well as the upstream heated rolls in air-flow design in order to improve the film quality even more.

In the production of tubular film, the disclosed-design unit for the length change of a film web can be integrated in-line within a blown film line.

Seen in film transport direction, blown film lines include a resin dosing unit, an extruder, followed by a film die head and a cooling unit as well as a calibration basket. Downstream of these components are a lay-flat unit, a take-off unit and a turning device. The tubular film is then wound using a winder.

When producing tubular film with blown film lines, the disclosed-design device to change the length with at least one processing gap delimited by two rolls, whereby at least one of these rolls is an air-flow roll, can be located direct in film transport direction above the pair of take-off rolls of the take-off unit either upstream or downstream of the turning bars. Possible is also several disclosed-design units which include at least one processing gap delimited by the two rolls within a blown film line.

In addition, they can also be combined with more air-flow rolls.

In this context, the take-off unit can be stationary, rotating or designed as an oscillating take-off unit. It can also be operated without turning bars.

The disclosed-design device to permit monoaxial changes in length can be arranged as an integral component of an orientation line within a blown film line in film transport direction above the pair of take-off rolls either upstream or downstream of the turning bars above the tubular film bubble.

Alternatively, the device can be located within an orientation line also in-line on the floor next to the blown film line or offline on the floor next to the blown film line. In each case, the blown film line can be designed with or without an oscillating take-off unit.

Also possible is to have two of the disclosed-design devices to permit monoaxial changes in length arranged as components of an orientation line, a so-called MDO system, in-line downstream of a blown film line. In this case, the tubular film is then cut on both sides at opposite points into two film webs, each of which is further processed with an orientation line.

In order to further optimise the quality of the film web, use of the disclosed-design device can be combined with the application of film thickness regulation systems. With the combined use of film thickness regulation systems in the production of tubular film, e.g. as defined in patent DE 10 2009 033 171 A1, and air-flow rolls in the device for length change, a further positive effect occurs, because if the neck-in in the film web is lower, then less energy needs to be introduced into the regulation system in order to optimise the flatness, a fine-tuned regulation is possible and thus the process is simplified.

The device for length change can also be employed within an orientation or annealing line for handling cast film.

In a disclosed-design process to permit monoaxial changes in the length of film webs, the film web is routed via at least one processing gap delimited by two rolls. Whereby the first roll in film transport direction exhibits a first peripheral speed and the second roll in film transport direction exhibits a second peripheral speed. At least one of these rolls is an air-flow roll which ensures that the film web routed over it lies direct on the roll in order to counteract transverse neck-in and an edge build-up of the film web and to prevent the formation of air cushions between roll and film web. With a combination of air-flow and tempering roll, the heat transfer between the film and roll is furthermore increased because the insulating layer of air in between can flow off through the air-flow roll. A stable orientation process is thus achieved and as a result, a homogeneous film with no flatness defects because the film has uniform contact across its entire lay-flat width on the roll.

If negative pressure is applied, the effect is even stronger. The suction generated by the negative pressure results in improved fixing of the release edge of the film on the roll in film transport direction at the point where the film runs off the roll, as well as of the lay-on edge of the film on the roll in film transport direction at the point where the film runs onto the roll, so that a lower relative speed difference in transverse and longitudinal direction across the lay-flat width between the film and roll occurs.

For further optimisation of the film web quality, the process is combined with a film thickness regulation system as described in patent DE 10 2009 033 171 A1. In this case, a tubular film is subjected during its production with a blown film line to a film thickness regulation, whereby the thickness profile of the film tube is regulated such that the film tube displays thin spots at those points which in a downstream orientation line operated in-line represent the peripheral zones of the laid-flat tubular film, so that after orientation of the film in an orientation line, a film with as few deviations as possible from the average film thickness across the film width results. If the film web is now during orientation in the orientation line additionally routed through the device for length change via an air-flow roll with negative pressure source which sucks the film onto it and thus prevents transverse neck-in and edge build-up, film of even better quality is produced. Application of a negative pressure source at the air-flow roll improves the quality even further. The laid-flat tubular film can be a blocked film, a film cut through on one or two sides, a twice-laid-flat tubular film or a film processed on one side in two orientation units.

Use of an air-flow roll with and without connection to a negative pressure source as a roll, especially as an orientation roll, increases the adhesion of the film web on the roll and thus leads to less transverse neck-in as well as to a reduced edge build-up of the film web and thus to an improved flatness of the film. This serves to reduce the previously unavoidable edge trimming waste. Both increase the economic efficiency during the production of oriented film.

Other details, features and advantages of the subject matter of the disclosure arise from the claims and from the following description of the associated drawings in which a preferred embodiment of the disclosure is shown by way of example.

DETAILED DESCRIPTION

Figure 1:
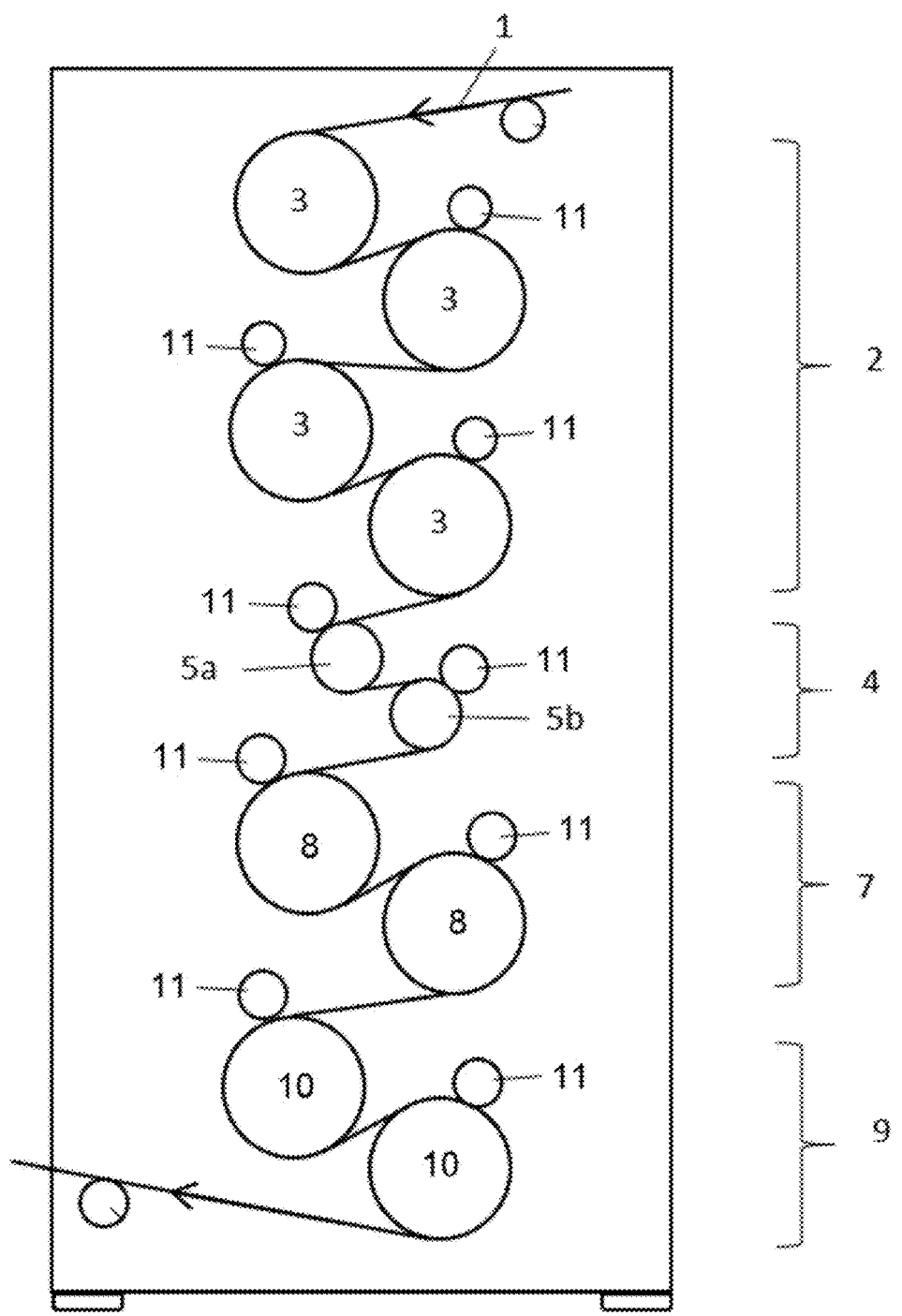
FIG. 1 shows an orientation line with the disclosed-design device to permit monoaxial changes to the length of a film web in machine direction.

FIG. 1 shows the disclosed-design device to permit monoaxial changes to the length of a film web in machine direction within an orientation line, also known as an MDO line, as an application possibility of the disclosed-design device.

The film web (1) is introduced into the orientation line from above. It is then routed via a heating section (2) with heated rolls (3). The film web (1) is then routed to the disclosed-design device for length change (4), here the orientation unit (4), with the rolls (5), here the orientation rolls with the processing gap in between, here the orientation gap (6), and is oriented. The diameter of the orientation rolls (5) can be smaller than that of the heated rolls. The film web (1) is subsequently routed to an annealing section (7) with annealing rolls (8) for tempering, followed by a cooling section (9) with cooling rolls (10). The film (1) finally exits the MDO system and can be wound with the winder. The film web is held securely on the different rolls by means of lay-on rolls (11).

Figure 2:
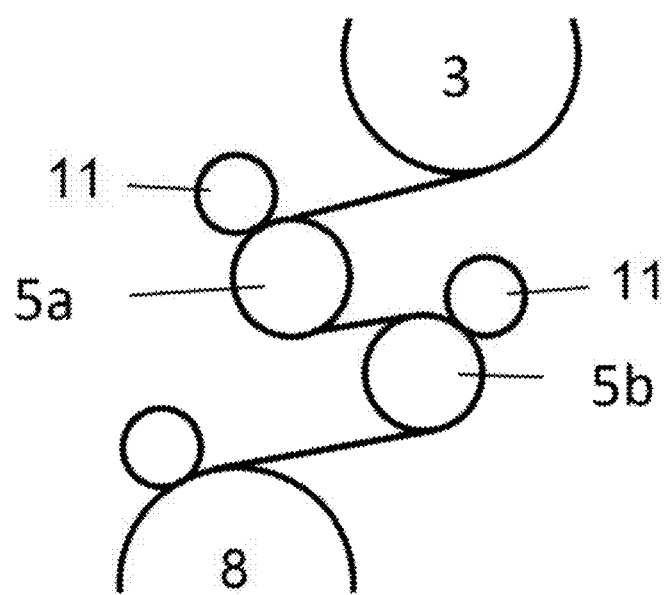
FIG. 2 shows a device to permit monoaxial changes to the length of a film web in machine direction

FIG. 2 shows the device for length change (4) of the orientation line in detail. The film web (1) is routed over the first orientation roll (5a) to the second orientation roll (5b). The orientation gap (6) is located between the orientation rolls (5a) and (5b). In this orientation line, the second orientation roll (5b) has a higher peripheral speed than the first orientation roll (5a) so that a positive length alteration results. The lay-on rolls (11) serve to additionally fix the film web (1) on the orientation rolls (5a) and (5b).

The film web (1) then exits the disclosed-design device (4). The orientation roll (5b) is designed in accordance with the disclosure as an air-flow roll with the possibility of connecting up a negative pressure source, not shown here. The orientation roll (5a) and the orientation roll (5b) can also be designed in addition as tempering rolls. In that case, the orientation roll (5b) is a combination of air-flow roll and tempering roll.

Dependent on the orientation task, individual lay-on rolls (11) or all of them can be omitted.

Orientation lines can also have more than two orientation rolls (5) and thus have more disclosed-design devices (4).

The orientation line can have two, three or more heated rolls, orientation rolls, annealing rolls or cooling rolls in each case.

Legend
1 Film web
2 Heating section
3 Heated rolls
4 Device for length change/orientation unit
5 Rolls/orientation rolls
5a First roll/orientation roll
5b Second orientation roll/roll
6 Processing gap/orientation gap
7 Annealing section
8 Annealing rolls
9 Cooling section
10 Cooling rolls
11 Lay-on rolls

The invention claimed is:

1. A device for permitting a monoaxial length change of a film web in a machine direction, the device comprising:
a processing gap delimited by a first and a second roll via which the film web is routed in the machine direction, the first roll in a film transport direction being upstream of the processing gap and being configured to operate at a first peripheral speed, and the second roll in the film transport direction being downstream of the processing gap and being configured to operate at a second peripheral speed such that the film web that is routed through the processing gap experiences monoaxial length change,
wherein the first roll is an air-flow roll through which air can flow,
the second roll is also an air-flow roll through which air can flow,
at least one of the first roll and the second roll is a combined tempering and air-flow roll through which air can flow, the combined tempering and air-flow roll being formed as a double-jacket roll having channels for air flow,
the device further comprises a negative pressure source connected to the second roll that is downstream of the processing gap, the negative pressure source being configured to apply a negative pressure to the second roll such that air from outside flows through the second roll into an inside of the second roll so as to generate suction where the film web is routed over the second roll, and the second roll being configured such that the suction generated by the negative pressure sucks the film web onto the second roll during the monoaxial length change so as to reduce transverse neck-in and edge build-up, and
the negative pressure source is further configured for applying different degrees of negative pressure along a length of the second roll, the negative pressure source applying more suction at the edges of the film web than towards the center of the film web.

2. The device in accordance with claim 1, further comprising a temperature control configured for operating with the combined tempering and air-flow roll.

3. The device in accordance with claim 1, wherein the first roll in the film transport direction is configured to operate at a lower peripheral speed than the second roll in the film transport direction so that the monoaxial length change, which is experienced by the film web that is routed through the processing gap, is positive.

4. The device in accordance with claim 1, wherein the first roll in the film transport direction is configured to operate at a higher peripheral speed than the second roll in the film transport direction so that the monoaxial length change, which is experienced by the film web that is routed through the processing gap, is negative.

5. The device in accordance with claim 1, wherein the device is an integral part of an orientation line.

6. The device in accordance with claim 5, wherein the orientation line includes additional combined tempering and air-flow rolls that are configured to operate with and without applied negative pressure.

7. The device in accordance with claim 5, wherein the orientation line is located in-line within a blown film line.

8. A blown film line for producing a tubular film, the blown film line comprising the device in accordance with claim 1 is located in-line within the blown film line.

9. The blown film line in accordance with claim 8, further comprising:
a pair of take-off rolls; and
turning bars,
wherein the device is located in the film transport direction downstream of the pair of take-off rolls, and upstream or downstream of the turning bars of the blown film line.

10. The device in accordance with claim 1, wherein the combined tempering and air-flow roll is composed of an open-pore material having pores sized in a micrometer range.

11. The device in accordance with claim 1, wherein the combined tempering and air-flow roll is configured to operate such that the film web has direct contact on the combined tempering and air-flow roll across an entire width where the film web is routed over the combined tempering and air-flow roll.

12. The device in accordance with claim 1, wherein the combined tempering and air-flow roll includes an air-permeable layer that is made of non-corrosive stainless steel and has a sintered structure.

13. The device in accordance with claim 1, wherein the second roll, to which the negative pressure source is connected, is the combined tempering and air-flow roll that is formed as a double-jacket roll having channels for air flow.

14. The device in accordance with claim 13,
wherein on one side of the combined tempering and air-flow roll, a fluid for tempering the combined tempering and air-flow roll is supplied and removed via a first rotary union, and
on the opposite side to where the fluid is supplied and removed, the negative pressure source is connected to the combined tempering and air-flow roll via a second rotary union.

15. A device for permitting a monoaxial length change of a film web in a machine direction, the device comprising: a processing gap delimited by a first and a second roll via which the film web is routed in the machine direction, the first roll in a film transport direction being upstream of the processing dap and being configured to operate at a first peripheral speedy and the second roll in the film transport direction being downstream of the processing gap and being configured to operate at a second peripheral speed such that the film web that is routed through the processing gap experiences monoaxial length change, wherein the second roll is a combined tempering and air-flow roll through which air can flow, the device further comprises a negative pressure source connected to the combined tempering and air-flow roll that is downstream of the processing gap, the negative pressure source being configured to apply a negative pressure to the combined tempering and air-flow roll such that air from outside flows through the combined tempering and air-flow roll into an inside of the combined tempering and air-flow roll so as to generate suction where the film web is routed over the combined tempering and air-flow roll, and the combined tempering and air-flow roll being configured such that the suction generated by the negative pressure sucks the film web onto the combined tempering and air-flow roll during the monoaxial length change so as to reduce transverse neck-in and edge build-up, the combined tempering and air-flow roll is formed as a fluid-tempered double-jacket roll that includes additional channels for air flows and includes an air-permeable layer having a sintered structure, on one side of the combined tempering and air-flow roll, a fluid for tempering the combined tempering and air-flow roll is supplied and removed via a first rotary union, and on the opposite side to where the fluid is supplied and removed, the negative pressure source is connected to the combined tempering and air-flow roll via a second rotary union, wherein the negative pressure source is further configured for applying different degrees of negative pressure along a length of the combined tempering and air-flow roll, the negative pressure source applying more suction at the edges of the film web than towards the center of the film web.

16. A blown film line for producing a tubular film, the blown film line comprising the device in accordance with claim 15 is located in-line within the blown film line.

17. The device in accordance with claim 15, wherein the air-permeable layer is made of non-corrosive stainless steel with a sintered structure, the stainless steel being polished to a glossy finish.

18. A device for permitting a monoaxial length change of a film web, the device comprising: a first roll and a second roll with a processing gap therebetween, the film web being routed over the first and second rolls in a film transport direction, wherein the first roll is upstream of the processing dap and is configured to operate at a first peripheral speed, and the second roll is downstream of the processing gap and is configured to operate at a second peripheral speed, which is different than the first peripheral speed, so that the film web that is routed over the first and second rolls experiences monoaxial length change, the first roll is an air-flow roll through which air can flow, the second roll is a combined tempering and air-flow roll through which air can flow, and the device further comprises means for applying a negative pressure to the second roll, which is the combined tempering and air-flow roll, such that air from outside flows through the second roll into an inside of the second roll so as to generate suction where the film web is routed over the second roll, and the second roll is configured such that the suction generated by the negative pressure sucks the film web onto the second roll during the monoaxial length change so as to reduce transverse neck-in and edge build-up, wherein the negative pressure source is further configured for applying different degrees of negative pressure along a length of the second roll, the negative pressure source applying more suction at the edges of the film web than towards the center of the film web.

* * * * *